(No Model.)
W. A. CROWDUS & H. M. SUTTON.
CURRENT REGULATOR FOR DYNAMO ELECTRIC MACHINES.
No. 377,884. Patented Feb. 14, 1888.
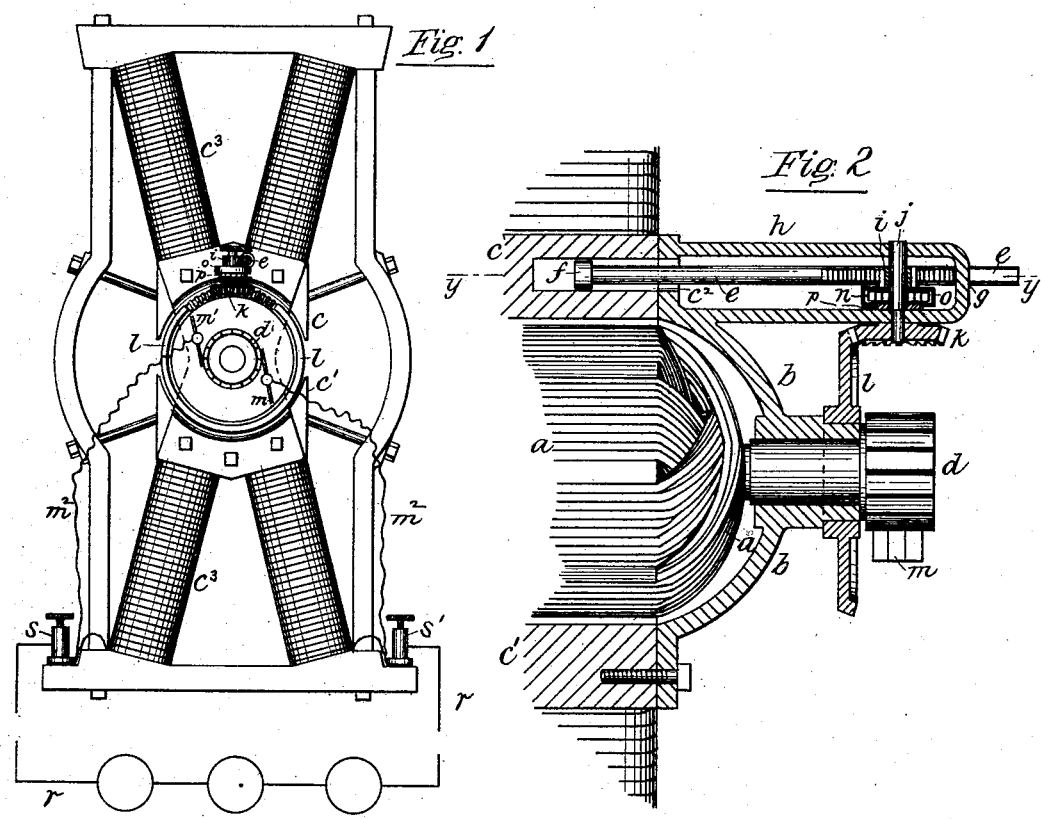
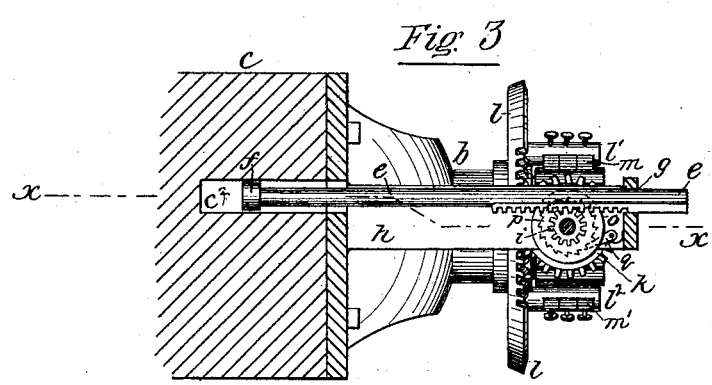
Witnesses.
H. D. Williams
John A. Hamilton.
Walter A. Crowdus
Henry M. Sutton
Inventors
per Alfred Shedlock
Atty.

ized cleanly# UNITED STATES PATENT OFFICE.

WALTER A. CROWDUS AND HENRY M. SUTTON, OF DALLAS, TEXAS.

CURRENT-REGULATOR FOR DYNAMO-ELECTRIC MACHINES.

SPECIFICATION forming part of Letters Patent No. 377,884, dated February 14, 1888.

Application filed December 14, 1886. Serial No. 221,510. (No model.)

*To all whom it may concern:*

Be it known that we, WALTER A. CROWDUS and HENRY M. SUTTON, both citizens of the United States, and residents of Dallas, county of Dallas, State of Texas, have invented certain new and useful Improvements in Current-Regulators for Dynamo-Electric Machines, of which the following is a specification.

The current-regulator for dynamo-electric machines forming the subject-matter of this application pertains to that class of regulators in which the collecting-brushes of the commutator are automatically moved around the commutator and caused to occupy different positions relatively to the maximum lines of the magnetic field between the poles and the armature; and it embraces a novel method of controlling the movement of the brushes to compensate for variations in the speed of the machine and regulate the current in accordance with the work to be done. To accomplish this we take advantage of the fluctuations in the magnetic strength of the field system of shunt-wound machines, which occur when the speed of the armature or the resistance of the working-circuit varies, to cause more or less current to be collected by the brushes, by allowing the magnetism of one of the poles of the field-magnets to act on a rod or bar of iron which is fitted to move freely in a hole formed in the pole, said rod being connected to the brush-carrier through a system of gears and provided with a spring whose resiliency is opposed to the attractive force of the magnet on the iron rod.

The rod is fitted with a piston working somewhat loosely in the hole formed in the pole, thus constituting a dash-pot or resistance device for retarding and regulating the speed or the rod when it is first set in motion by the magnetic pull in one direction or by the spring in the other direction. This opposing spring is so adjusted as to strength that when all the conditions under which the machine is working are normal the brushes are held in such position as to supply the outside circuit with normal current.

In the accompanying drawings forming part of this specification, to which we will now refer to more fully describe our invention, Figure 1 is a front elevation of a dynamo-electric machine provided with our improved current-regulator. Fig. 2 is a view in section of the regulator on an enlarged scale cut on the line $x\,x$, Fig. 3. Fig. 3 is a plan view of the same, partly in section, cut on the line $y\,y$, Fig. 2.

The dynamo-electric machine represented in the accompanying drawings to which our improved regulator is applied is similar in construction to that shown in another application filed simultaneously herewith, Serial No. 221,508; but the regulating device is adapted to be used on any of the ordinary forms of machines embodying the shunt-wound principle.

The commutator end of the armature $a$ rotates in the bearing $b$, secured to the poles $c\,c'$ of the field-magnet, the commutator $d$ being secured to the end of the armature projecting beyond the bearing and the ends of the coils of the armature-wire connected thereto through a sleeve on the shaft in the usual manner; or the commutator may be placed inside the bearing, as is done in some machines.

In a cylindrical hole or cavity formed in the pole $c$ is placed the iron rod $e$, provided with a head or piston, $f$, of non-magnetic material, which is fitted to slide freely in the cylindrical cavity, so that sufficient space is left between the piston and the sides of the cavity to allow the air to slowly escape from or enter the cylinder $c^2$, as the piston and rod are attracted in or moved out of the cylinder $c^2$, thus constituting a dash-pot adapted to retard the movement and prevent sudden changes of position of the rod $e$.

The outer end of the rod $e$ is held in the bearing $g$ on the frame $h$, which is attached to or forms a part of the frame of the bearing $b$, and rack-teeth are formed on the side of the rod, arranged to mesh into the pinion $i$, fitting on the short shaft $j$, also having bearings in the frame $h$. On the lower end of this shaft $j$ is secured the bevel-pinion $k$, meshing into teeth formed in the side of the brush-carrier $l$. This brush-carrier is constructed to rotate on the outside of the bearing $b$, and holds the two posts $l'\,l^2$, in which the brushes $m\,m'$ are clamped.

The coil-spring $n$ is fastened at its inner end to the shaft $j$, and at its outer end to the drum $o$, which is loose on the shaft $j$, and on the lower side of which is secured the ratchet-wheel $p$. A retention-pawl, $q$, pivoted to the frame $h$, catches into the ratchet-wheel $p$, and holds it and the drum $o$ in whatever position they may be set. The retractile force of the spring $n$ may be adjusted to a nicety to counteract the force of the magnetic pull of the pole $c$ on the iron rod $e$ by turning the drum $o$ on the shaft $j$, to wind or unwind the spring $n$, as desired, and then locking the drum by the pawl $q$.

The field-magnet wire $c^3$ is placed in shunt with the outside circuit, $r$, by being connected to the terminal posts $s\ s'$, to which posts the brushes $m\ m'$ are also connected by means of the flexible wires $m^2\ m^2$. Now it is evident that as the magnetism of the field fluctuates from variations in the resistance of the outside circuit, or from other causes, the pole $c$ will exert a variable attractive force on the rod $e$ against the retractile power of the spring $n$, thus causing the brushes $m\ m'$, through the medium of the rack-teeth on the rod $e$, the pinion $i$, bevel-wheel $k$, and brush-carrier $l$, to change their positions on the commutator each time the strength of the field-magnet changes, they being so adjusted in relation to the commutator that the current collected by them will always accord with the requirements of the work to be done in the outside circuit, as the strength of the field is always a function of the outside resistance.

Having now described our invention, what we claim, and desire to secure by Letters Patent, is—

1. In a current-regulator for dynamo-electric machines, in combination, an iron rod or bar provided with a piston-head, a field-magnet provided with a cylindrical cavity, within which the piston is placed, thereby acting as a dash-pot to the rod, a rotating brush-carrier, and a motion-transmitting device connecting the rod and brush-carrier together.

2. In a current-regulator for dynamo-electric machines, in combination, the pole of a field-magnet provided with a hole or cylindrical cavity, an iron rod arranged to slide freely in the cylindrical cavity, a brush-carrier and collecting-brushes held thereon, a motion-transmitting device joining the rod and brush-carrier, and a retractile spring arranged to act on the rod in opposition to the magnetism of the field-magnet pole.

3. In a current-regulator for dynamo-electric machines, a brush-carrier fitted to oscillate on a center coincident with the axis of the commutator, an iron rod arranged to slide longitudinally in a hole formed in one of the pole-pieces of the field-magnet system in direction parallel to the axis of the commutator, and gears connecting the rod to the brush-carrier, by which the sliding motion of the rod is converted into rotary motion at the brush-carrier.

4. In a current-regulator for dynamo-electric machines, in combination, the field-magnet pole $c$, provided with a cylindrical cavity, $c^2$, the rod $e$, carrying the piston $f$, fitting loosely in such cavity, the brush-carrier $l$, connected to the rod $e$ by gearing $i\ k$, the brushes $m\ m'$, and the commutator $d$, substantially as set forth.

5. In combination, the rod $e$, provided with rack-teeth, and actuated by an electro-magnet, the pinion $i$, the spring $n$, one end of which is secured to the shaft of the pinion and the other end to the drum $o$, fitted loosely on the pinion-shaft and provided with a ratchet-wheel, $p$, and the pawl $q$, whereby the ratchet-wheel may be held and the spring adjusted as desired, substantially as and for the purpose set forth.

6. In a current-regulator for dynamo-electric machines, in combination, the field-magnet pole $c$, provided with a cylindrical cavity, $c^2$, the rod $e$, provided with a piston, $f$, fitting loosely in such cavity and having rack-teeth formed thereon, the pinion $i$, the spring $n$, one end of which is secured to the pinion-shaft and the other to the drum $o$, the drum $o$, ratchet-wheel $p$, and pawl $q$, the bevel-pinion $k$, secured on the pinion shaft, the brush-carrier $l$, provided with teeth meshing into the bevel-pinion, the brushes $m\ m'$, and the commutator $d$, substantially as set forth.

In testimony whereof we have hereunto set our hands, at Dallas, county of Dallas, State of Texas, this 7th day of December, 1886.

WALTER A. CROWDUS.
HENRY M. SUTTON.

Witnesses:
S. S. MAYO,
C. F. CRUTCHER.